United States Patent [19]

Henderson et al.

[11] Patent Number: 4,647,850
[45] Date of Patent: Mar. 3, 1987

[54] INTEGRATED CIRCUIT FOR MEASURING MASK MISALIGNMENT

[75] Inventors: Brian M. Henderson, Escondido, Calif.; Alan M. Gundlach, Lasswade; Anthony J. Walton, Marchmont, both of Scotland

[73] Assignee: Burroughs Corporation, Detroit, Mich.

[21] Appl. No.: 658,416

[22] Filed: Oct. 5, 1984

[51] Int. Cl.$^4$ .................. G01B 7/00; G01R 27/14; H01L 21/66
[52] U.S. Cl. .................. 324/158 R; 33/1 D; 33/533; 148/DIG. 102; 324/65 R
[58] Field of Search .................. 324/158 R, 65 R; 340/870.38; 33/1 D, 533; 148/DIG. 102; 355/125, 133

[56] References Cited

U.S. PATENT DOCUMENTS

| | | | |
|---|---|---|---|
| 4,538,105 | 8/1985 | Ausschnitt | 324/158 R |
| 4,566,193 | 1/1986 | Hackleman et al. | 33/1 D |
| 4,571,538 | 2/1986 | Chow | 324/65 R |

OTHER PUBLICATIONS

IBM Technical Disclosure Bulletin, Genin, D. et al., "Incremental Structure for Electrical Determination of Mask Alignment", vol. 18, No. 11, Apr. 1976 pp. 3631-3632.

Buehler, M. "Comprehensive Test Patterns with Modular Test Structures: . . . ", Solid State Technology, Oct. 1979, pp. 89–94.

Henderson, B. et al., "Integrated Circuit Test Structure which Uses a Vernier . . . ", Electronics Letters, Oct. 12, 1983, vol. 10, No. 21, pp. 868–869.

Primary Examiner—Reinhard J. Eisenzopf
Assistant Examiner—Stephen M. Baker
Attorney, Agent, or Firm—Charles J. Fassbender; Kevin R. Peterson

[57] ABSTRACT

An integrated circuit for measuring conductor misalignment comprises: a set of $2n+1$ conductor pairs where n is a predetermined positive integer; each conductor pair includes a U-shaped conductor having a central axis; each conductor pair also includes a rectangular shaped conductor having a central axis and which is narrow enough to fit between the legs of the U-shaped conductor provided their central axis are aligned; and the rectangular shaped conductor of each conductor pair has its central axis a distance $\delta + k\Delta d$ from the central axis of the U-shaped conductor where $\Delta d$ is a fixed increment, k is an integer between $+n$ and $-n$ that differs for each conductor pair, and $\delta$ is a misalignment between the central axis of each conductor pair.

12 Claims, 19 Drawing Figures

INTEGRATED CIRCUIT FOR MEASURING MASK MISALIGNMENT

BACKGROUND OF THE INVENTION

This invention relates to the fabrication of integrated circuits; and more particularly, it relates to circuits for measuring the amount of misalignment between the various patterned layers in the integrated circuit.

As is well known, the fabrication of an integrated circuit includes the steps of patterning several different layers on a semiconductor substrate. Typically, a diffused or implanted region is first patterned in the substrate; thereafter a polysilicon layer is patterned over the diffused or implanted region; and subsequently at least one metal layer is patterned over the polysilicon. Also typically, these patterned conductive layers are separated by patterned insulating layers.

In the fabrication process, a different mask is used to pattern each layer. For example, to pattern the polysilicon layer, an unpatterned layer of polysilicon is first deposited across the substrate; then an unpatterned layer of photoresist is deposited over the layer of polysilicon; then a mask is used to expose selected areas of the resist to ultraviolet light; then the exposed areas are removed by a chemical or plasma etch; and then the regions of the polysilicon layer which are not covered by the remaining resist are removed by another etch.

Also in the fabrication of an integrated circuit, only a certain amount of misalignment between the masks that define the various conductor layers can be tolerated. Typically, that amount might be ±1 micron; but the amount of misalignment that is allowable decreases as the dimensions of the circuit features decrease. Thus, in order to monitor whether or not the circuit that is being fabricated is within tolerance, it is very desirable to provide a way to measure the amount of misalignment that occurs between the masks that define the conductive layers in the circuit.

Presently, this misalignment is measured via the optical inspection by an operator of an alignment pattern that is put on the substrate. For example, a portion of one of the conductive layer may be patterned as a large square, while a portion of another conductive layer is patterned as a small square which nominally is at the center of the large square. After the two squares are fabricated, an operator visually inspects their alignment under a microscope to determine if they are properly aligned. If any portion of the small square lies outside of the large square, then the alignment of the masks exceeds the allowable tolerance.

One problem however with such an optical determination of mask alignment is that it is very time consuming. Visual inspection must be done by the operator for each chip on a wafer; and typically, there are at least 50 chips per wafer. Another problem with the optical inspection method of measuring mask misalignment is that it is subject to human errors due to fatigue and poor judgment by the operator. Further, these problems become more severe as the allowable misalignment goes down.

Accordingly, a primary object of the invention is to provide an improved circuit for measuring the misalignment of the masks which define different conductive layers in an integrated circuit.

Another object of the invention is to provide a circuit which generates electrical signals that digitally indicate the amount of misalignment between conductors that were defined by two different masks.

BRIEF SUMMARY OF INVENTION

These objects and others are achieved in accordance with the present invention by an integrated circuit that is comprised of: a plurality of conductor pairs on a semiconductor substrate, with the conductors of each pair being offset from each other by a different distance; some conductor pairs have their conductors offset such that they overlap and contact one another by varying degrees, while the remaining conductor pairs have their conductors offset such that they are spaced apart by varying degrees; the different offsets are selected such that the particular conductor pairs that have contacting conductors varies with and indicates the amount of misalignment between the conductors; and a module coupled to the plurality of conductor pairs for generating electrical signals indicating which of the conductor pairs make contact.

In one preferred embodiment of the invention, one conductor of each pair is U-shaped; the other conductor of each pair is rectangular shaped; and the rectangular shaped conductor is narrow enough to fit between the legs of the U-shaped conductor when their central axes are aligned.

In another preferred embodiment of the invention, both conductors of each conductor pair are rectangular.

BRIEF DESCRIPTION OF THE FIGURES

Various preferred embodiments of the invention are described in the following Detailed Description in conjunction with the accompanying drawings wherein:

FIG. 1h illustrates a cross section of the conductor pair of FIG. 1a;

DETAILED DESCRIPTION

Figure 1A:
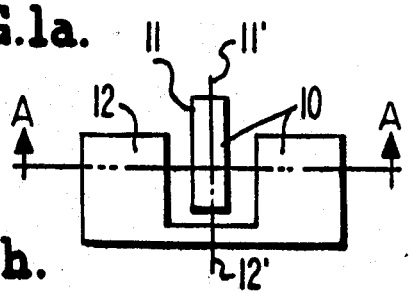
FIG. 1a through 1g illustrate respective conductor pairs which operate as switches in the present invention to measure mask misalignment.
Figure 1H:
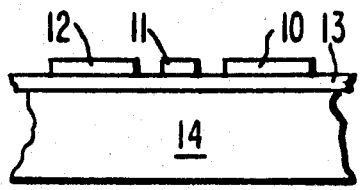
Figure 1B:
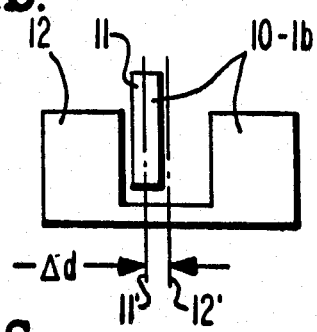
Figure 1C:
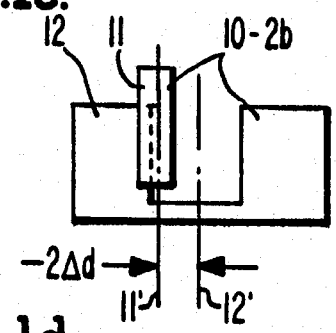
Figure 1D:
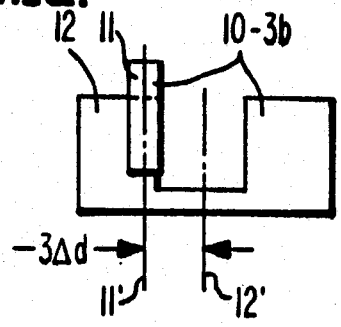
Figure 1E:
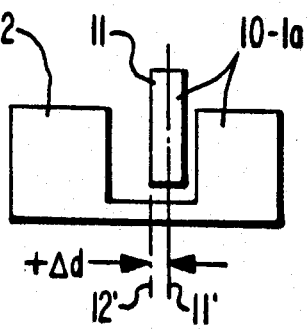
Figure 1F:
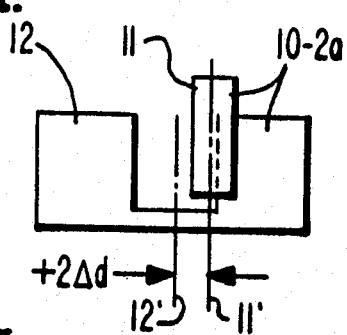
Figure 1G:
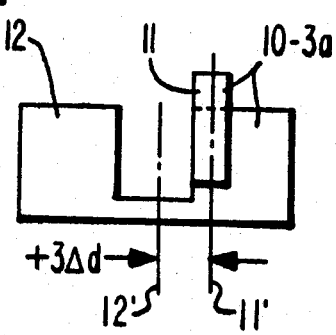

Referring now to FIG. 1, a preferred embodiment of the invention will be described in detail. This embodiment includes the plurality of 2n+1 conductor pairs where n is a predetermined positive integer. Preferably, n is at least ten. In FIG. 1, some of these conductor pairs are indicated by reference numerals 10, 10-1a, 10-1b, 10-2a, 10-2b, 10-3a and 10-3b.

One of the conductors 11 of each pair is rectangular shaped and the other conductor 12 of each pair is U-shaped. Also, each rectangular shaped conductor 11 is narrow enough to fit between the legs of the U-shaped conductor 12 when they are in alignment. However, the rectangular shaped conductor 11 and U-shaped conductor 12 of each pair are offset from one another by different distances. Thus conductors 11 and 12 of some of the pairs overlap and contact one another by varying degrees, while conductors 11 and 12 of the remaining pairs are spaced apart by varying degrees.

A cross sectional view of conductors 11 and 12 taken along lines a—a is also shown in FIG. 1. This cross section shows conductors 11 and 12 when one of them is made of a layer of metal and the other is made of a layer of polysilicon. For example, conductor 11 could be patterned from the first layer metal and conductor 12 patterned from the polysilicon, or vice versa.

In the fabrication process, the layer of polysilicon is patterned on an insulating layer 13 (e.g.—SiO$_2$ or Si$_3$N$_4$) which lies on top of a substrate 14. Then a second insulating layer (not shown) is deposited over the patterned polysilicon. Thereafter, a large opening in the second insulating layer is made to expose the conductor that is made of the polysilicon and the surrounding insulating layer 13. Subsequently, the layer of metal is deposited over the opening and it is patterned as the other conductor of the pair.

Also, the cross section shows conductors 11 and 12 when one of them is patterned from a first layer of metal and the other is patterned from a second layer of metal. For example, conductor 11 could be the first layer metal and conductor 12 made of the second layer metal, or vice versa.

In the embodiment of FIG. 1, the rectangular shaped conductor 11 of each conductor pair nominally has its central axis 11' a distance k$\Delta$d from the central axis 12' of the U-shaped conductor. Here, k is an integer between +n and −n that differs for each conductor pair, and $\Delta$d is a fixed increment. Preferably, $\Delta$d is 0.10 microns or some other increment less than 0.15 microns.

For the conductor pair 10, the variable k is 0; for the conductor pair 10-1a the variable k is 1; for the conductor pair 10-1b the variable k is −1; for the conductor pair 10-2a the variable k is 2; etc. In other words, the nominal offset for axis 11' and 12' of conductor pair 10 is 0; the nominal offset for axis 11' and 12' of conductor pair 10-1a is +$\Delta$d; the nominal offset for axis 11' and 12' of conductor pair 10-1b is −$\Delta$d; the nominal offset for axis 11' and 12' of conductor pair 10-2a is +2$\Delta$d; etc.

However, in the actual integrated circuit, the above described nominal offset is seldom achieved. This is because all of the conductors 11 are defined by one mask; all of the other conductors 12 are defined by another mask; and typically, these two masks have a certain amount of misalignment $\delta$ between them that varies from one chip to another. Thus, in the actual circuit that is made on substrate 14, the distance between the central axis of conductors 11 and 12 is $\delta$+k$\Delta$d, where k, and $\Delta$d are as defined above.

When zero misalignment occurs between conductors 11 and 12, then as FIG. 1 shows, only the conductors of pairs 10, 10-1a, and 10-1b do not contact each other. Thus the fact that only the conductors of pairs 10, 10-1a, and 10-1b do not contact each other indicates that zero misalignment occurd between the masks that defined conductors 11 and 12.

If the misalignment between the masks that define conductors 11 and 12 is +$\Delta$d (i.e. a distance of $\Delta$d to the right), then only the conductors of pairs 10, 10-1a, and 10-2b will not make contact. As another example, if the masks which define conductors 11 and 12 are misaligned by +2$\Delta$d, then only the conductors of pairs 10-1b, 10-2b, and 10-3b, will not make contact.

As a further example, if the masks which define conductors 11 and 12 are misaligned by a −$\Delta$d (i.e. distance of $\Delta$d to the left), then only the conductors of pairs 10, 10-1a, and 10-2a will not make contact. Thus the particular conductor pairs that have noncontacting conductors indicates the degree, if any, of misalignment between the masks that define the conductors.

Figure 2:
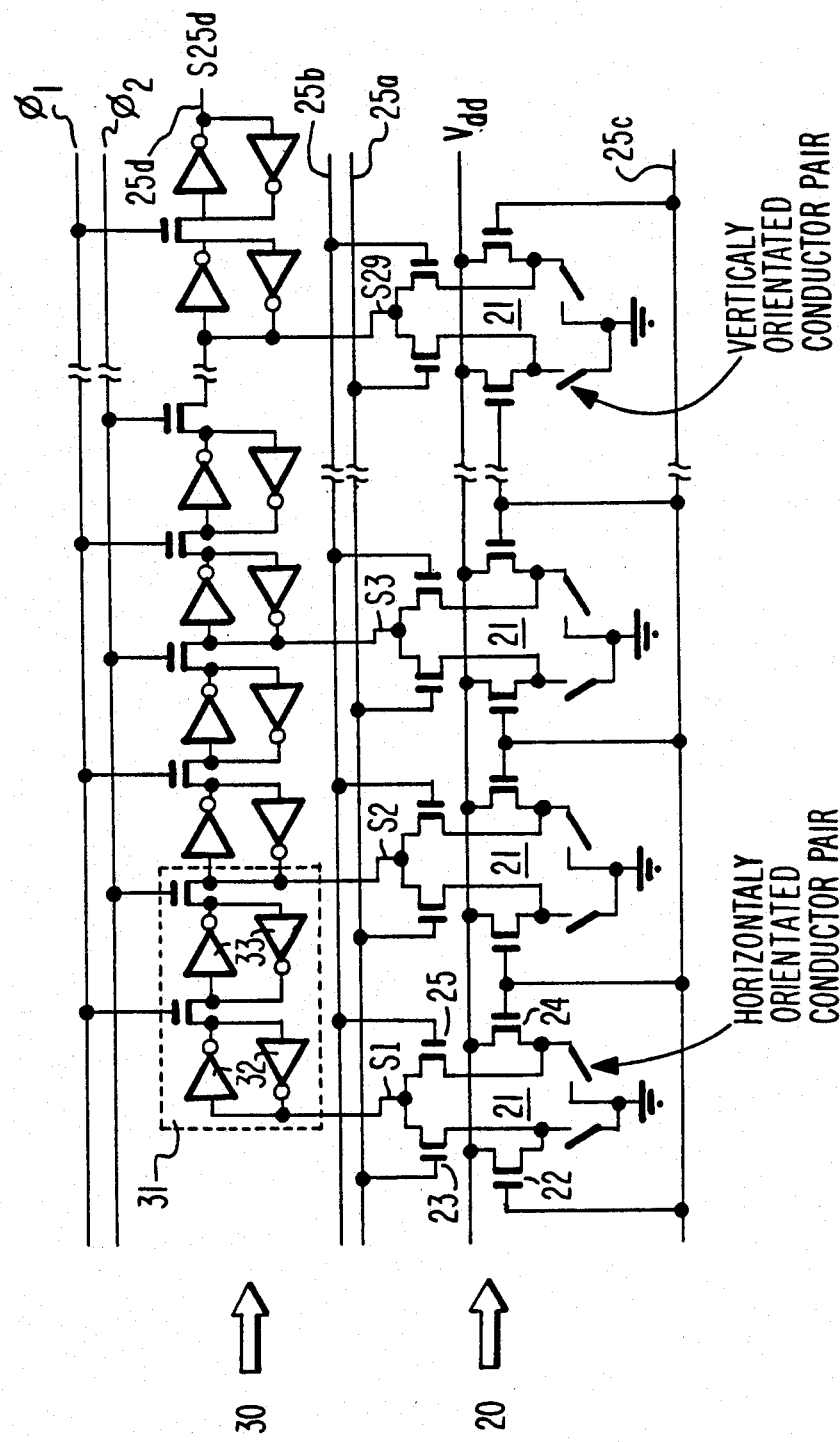
FIG. 2 illustrates a circuit which incorporates the conductor pairs of FIGS. 1a through 1h (hereinafter FIG. 1) to measure mask misalignment.

Preferably, the conductors of FIG. 1 are fabricated on substrate 14 in conjunction with the circuitry of FIG. 2. That circuitry includes a module 20 which is coupled to the conductor pairs for generating output signals S1, S2, . . . indicating which of the conductor pairs contact each other; and it also includes another module 30 which is coupled to module 20 for receiving the output signals and shifting them in serial fashion to an output terminal.

Module 20 includes a separate stage 21 for each of the conductor pairs. In FIG. 2, each of the conductor pairs is represented by a mechanical switch. This switch closes when the two conductors of a pair contact each other, and it opens when the two conductors of a pair do not contact each other.

Also in FIG. 2, each of the conductor pairs is shown twice—once by a switch having a horizontal orientation, and once by a switch having a vertical orientation. This is because preferably, one set of conductor pairs is disposed in a horizontal direction along the chip in order to measure the horizontal misalignment of the masks which define them; while another set of the conductor pairs is disposed in a vertical direction along the chip in order to measure the vertical misalignment of the masks which define them.

Each of the stages 21 has four transistors 22, 23, 24 and 25 which are interconnected as illustrated in FIG. 2. Transistor 22 provides a resistive coupling from a voltage source Vdd to one of the conductors of a vertically oriented pair, while the other conductor of the same pair is coupled to the ground.

Thus when the conductors of a pair are open, the voltage Vdd occurs across them; whereas when the conductors make contact, zero volts occur across them. That voltage which occurs across each pair of ocnductors is then coupled via transistor 23 to module 30 as output signals S1, S2, . . . etc. Transistors 24 and 25 respectively operate similar to transistors 22 and 23; however they work in conjunction with a horizontally oriented conductor pair.

In order to select the voltages that occur across the vertically oriented conductor pairs as the output signals, a control line 25a is provided. Similarly in order to select the voltages that occur across the horizontally oriented conductor pairs as the output signals, a control line 25b is provided. Another control line 25c is also provided which turns off transistors 22 and 24 to decouple voltage Vdd from the conductor pairs when the FIG. 2 circuit is not in use.

Each of the output signals S1, S2, . . . is received by a separate stage 31 in module 30. These stages are interconnected in a serial fashion to form a shift register. Each stage 31 of the shift register includes two pairs 32 and 33 of cross coupled inverters.

Signals S1, S2 . . . are received by the cross coupled inverters 32 is response to an externally generated control signal on one of the control line 25a or 25b. Then, the S1, S2, . . . signals are serially shifted through module 30 to an ouput line 25d in response to phase I and phase II clock signals which are alternately sent to each of the stages 31.

Figure 3:
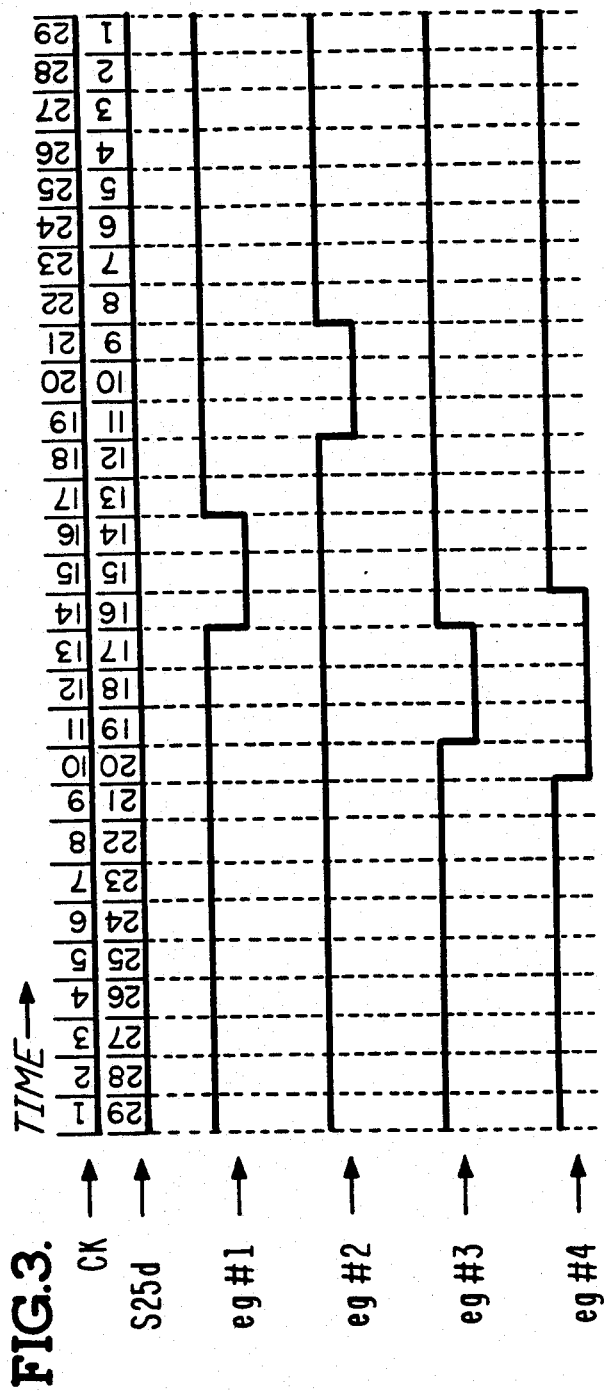
FIG. 3 illustrates several waveforms that show the operation of the invention of FIGS. 1 and 2.

FIG. 3 shows several waveforms that illustrate the operation of the FIG. 2 circuit. One of these waveforms is labeled CK, and it indicates a sequence of several clock time intervals. Another waveform labeled S25d shows the signal that is being sent from module 30 to output line 25d.

In FIG. 3, it is assumed that module 30 has a total of twenty-nine stages. Thus, signal S29 is sent to output line 25d during clock No. 1; signal S28 is sent to output line 25d during clock No. 2; etc.

Preferably, the conductor pair which nominally has their central axis in alignment is coupled to the center stage of module 30. Thus in FIG. 3, the signal from conductor pair 10 occurs on output line 25d during clock No. 15. Each of the remaining conductor pairs are symmetrically coupled to the remaining stages of module 30. Thus the signal from conductor pair 10-1a occurs during clock No. 14; the signal from conductor pair 10-1b occurs during clock No. 16; etc.

FIG. 3 also shows some specific examples of what waveform on output line 25d looks like. In example No. 1, that waveform is a logical "1" during all the clock intervals except intervals 14, 15, and 16. This indicates that zero misalignment occurred between the masks that define conductors 11 and 12.

In example No. 2, the waveform on output line 25d is a logical "1" during all the clock time intervals except intervals 9, 10, and 11. This indicates that the masks which define conductors 11 and 12 are misaligned by $+5\Delta d$ or a distance of $5\Delta d$ to the right.

In example No. 3, the line 25d waveform is a logical "1" during all the clock intervals except intervals 17, 18, and 19. This indicates that the masks which define conductors 11 and 12 is misaligned by $-3\Delta d$ or $3\Delta d$ to the left.

Finally, in example No. 4, the line 25d waveform is a logical "1" during all the time intervals except intervals 16, 17, 18, 19, and 20. This again indicates a misalignment of $-3\Delta d$. However, since a total of five logical zeros occurred rather than three, this also indicates that an overetching of conductors 11 and 12 took place in their fabrication. Such an overetching makes conductors 11 more narrow and/or makes the distance between the legs of the U-shaped conductor 12 more wide; and this causes two less conductor pairs to make contact.

One preferred embodiment of the invention has now been described in detail. In addition however, many changes and modifications can be made to this embodiment without departing from the nature and spirit of the invention.

Figure 4:
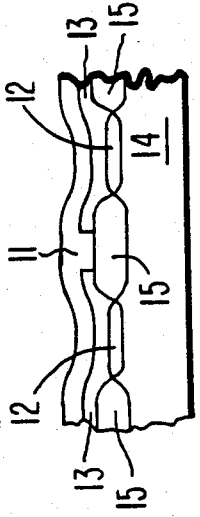
FIG. 4 illustrates a modification to the FIG. 1 embodiment.
Figure 6A:
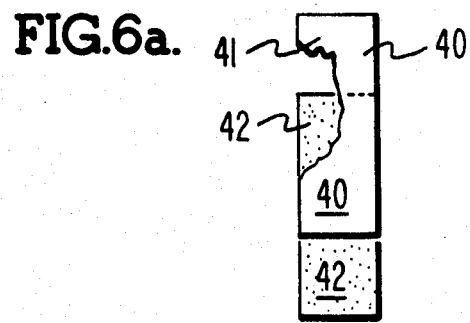
FIGS. 6a through 6g (hereinafter FIG. 6) illustrates still another modification to the FIG. 1 embodiment.
Figure 6B:
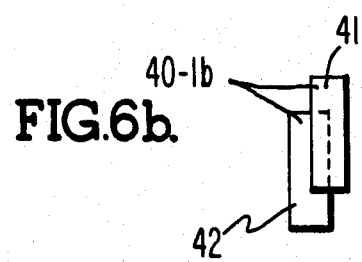
Figure 6E:
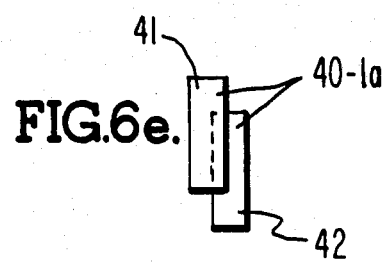
Figure 6C:
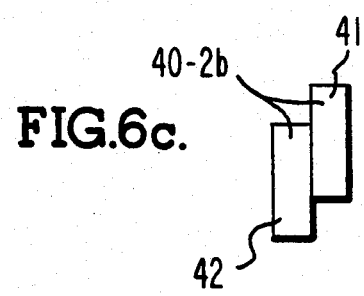
Figure 6F:
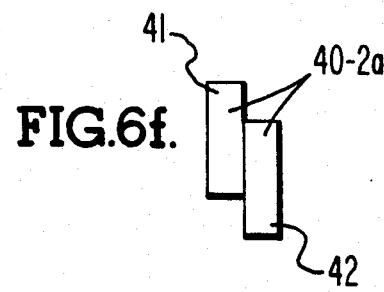
Figure 6D:
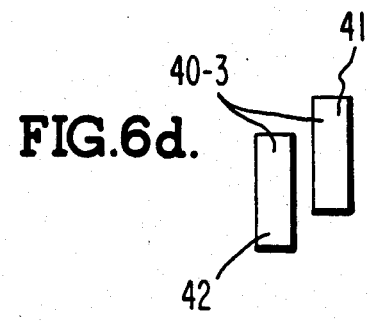
Figure 6G:
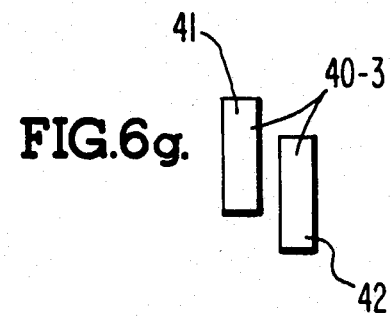

For example, FIG. 4 is a cross section of conductors 11 and 12 taken along lines a—a in FIG. 1 which shows conductor 11 as being a patterned metal conductor or patterned polysilicon conductor and conductor 12 as being a doped region in substrate 14. In this embodiment, conductor 12 may be an implanted region or a diffused region whose perimeter is bordered by field oxide 15.

With the embodiment of FIG. 4, the misalignment that is indicated by the S1, S2, ... signals is the misalignment between the mask which defines the perimeter of conductor 12 and the mask which defines the contact hole in insulating layer 13 for conductor 11. This is to be compared with the FIG. 1 embodiment in which the misalignment that the S1, S2, ... signals indicate is a misalignment between the masks which define the perimeters of conductors 11 and 12.

Figure 5:
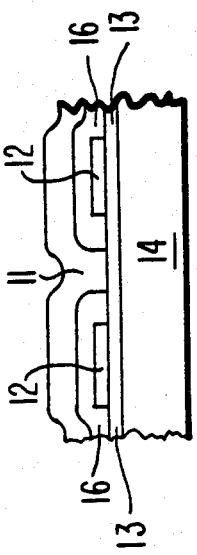
FIG. 5 illustrates another modification of the FIG. 1 embodiment.

Turning now to FIG. 5, it illustrates a cross section of conductors 11 and 12 taken along lines a—a in FIG. 1 when conductor 11 is made of a patterned metal and conductor 12 is made of patterned polysilicon. Conductors 11 and 12 are separated by an insulating layer 16. With this embodiment, the misalignment which the S1, S2, ... signals indicate is the misalignment between the mask which defines the perimeter of conductor 12 and the mask which defines the contact hole for conductor 11.

FIG. 6 shows still another embodiment of the invention. In this embodiment, both the conductors of each pair are rectangular in shape. These conductors are indicated by reference numerals 41 and 42 which respectively correspond to conductors 11 and 12 in FIG. 1 embodiment. Reference numeral 40 indicates the conductor pair which nominally have their central axis in alignment; reference numeral 40-1a indicates the conductor pair which nominally have their central axis offset by $+1\Delta d$; reference numeral 40-1b indicates the conductor pair which nominally have their central axis offset by $-1\Delta d$; etc.

When the misalignment between the masks which define conductors 41 and 42 is zero, only the conductors of pairs 40, 40-1a, and 40-1b contact one another. However, when the misalignment between the masks which define conductors 41 and 42 is $+1\Delta d$, then only the conductors of pairs 40, 40-1b, and 40-2b contact each other. And when the masks which define conductors 41 and 42 are misaligned by $-1\Delta d$, only then the conductors of pairs 40, 40-1b, and 40-2a contact one another.

Thus, in the FIG. 6 embodiment, the particular conductor pairs that have contacting conductors provide an indication of the misalignment between the masks which define those conductors. This is the opposite of the operation of the FIG. 1 embodiment in which the particular conductor pairs which had noncontacting conductors provides an indication of the misalignment between the masks which define those conductors.

Any of the conductor pair embodiments of FIGS. 1, 4, 5, and 6 may be made in combination on a single semiconductor substrate. For example, one embodiment may be formed to measure misalignment between polysilicon and metal; another embodiment may be formed to measure misalignment between diffusions and metal; etc. These various embodiments may then be coupled to a single module 20 and single module 30 of FIG. 2 so that their output signals can be sequentially read. For example, the transistors 23 would select the output signals that indicate polysilicon-metal misalignment; transistors 25 would select metal-diffusion misalignment signals; etc.

Various other changes and modifications may also be made to the above described details without departing from the nature and spirit of the invention. Accordingly, it is to be understood that the invention is not limited to those details but is defined by the appended claims.

What is claimed is:

1. An integrated circuit on a semiconductor substrate for measuring misalignment comprising:
    a set of $2n+1$ conductor pairs where n is a predetermined positive integer;
    each conductor pair including a U-shaped conductor having a central axis;
    each conductor pair also including a rectangular shaped conductor having a central axis and which is narrow enough to fit between the legs of said U-shaped conductor provided their central axes are aligned; and
    the rectangular shaped conductor of each conductor pair having its central axis a distance $\delta + k\Delta d$ from the central axis of the U-shaped conductor where $\Delta d$ is a fixed increment, k is an integer between $+n$ and $-n$ that differs for each conductor pair, and $\delta$ is a misalignment between the central axis of each conductor pair.

2. An integrated circuit according to claim 1 wherein one conductor of each pair is polysilicon, and the other conductor is metal.

3. An integrated circuit according to claim 1 wherein one conductor of each pair is a doped region in said substrate and the other conductor is metal.

4. An integrated circuit according to claim 1 wherein one conductor of each pair is polysilicon and the other conductor is a doped region in said substrate.

5. A integrated circuit according to claim 1 wherein both conductors of each pair are metal.

6. An integrated circuit according to claim 1 and further including a signal generating means coupled to said conductor pairs for generating signals indicating which rectangular shaped conductors are aligned to fit between the legs of their corresponding U-shaped conductors.

7. An integrated circuit according to claim 6 and further including a shift register means coupled to said signal generating means for receiving said signals and shifting them in a serial fashion to an output terminal.

8. An integrated circuit according to claim 1 wherein $\Delta d$ is less than 0.15 microns.

9. An integrated circuit according to claim 1 wherein n is at least 10.

10. An integrated circuit comprising:

a plurality of conductor pairs with the conductors of each pair being offset from each other by a different distance;

some conductor pairs having their conductors offset such that they overlap and contact one another by varying degrees, while the remaining conductor pairs having their conductors offset such that they are spaced apart by varying degrees;

said different offsets being selected such that the particular conductor pairs that have contacting conductors indicate the amount, if any, of misalignment between the conductors; and means, coupled to said plurality of conductor pairs, for generating electrical signals indicating which of said conductor pairs have contacting conductors.

11. An integrated circuit according to claim 10 wherein one conductor of each conductor pair is U-shaped; the other conductor of each conductor pair is rectangular; and the rectangular shaped conductor is narrow enough to fit between the legs of the U-shaped conductor.

12. An integrated circuit according to claim 10 wherein both conductors of each conductor pair are rectangular.

* * * * *